: 2,855,429

(2-NITROALKENYL)PHENOXYALKANOATES AND PROCESS

Dale N. Robertson, Midland, Mich., assignor to The Dow Chemical Company, Midland, Mich., a corporation of Delaware No Drawing. Application October 18, 1956
Serial No. 616,645

7 Claims. (Cl. 260—471)

This invention is concerned with phenoxy compounds and a method for their preparation and is particularly directed to the 2-nitroalkenylphenoxyalkanoic acids and their esters.

The compounds of this invention have the general structure

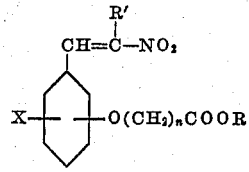

In this and succeeding formulae, X represents hydrogen, alkoxy radicals containing from 1 to 4 carbon atoms, inclusive, alkyl radicals containing from 1 to 4 carbon atoms, inclusive, or halogen; R represents hydrogen, phenyl or a lower alkyl radical containing from 1 to 7 carbon atoms, inclusive; R' represents phenyl or a lower alkyl radical containing from 1 to 7 carbon atoms, inclusive; and $n$ is an integer from 1 to 3, inclusive. These compounds are yellow solids or oils soluble in many organic solvents such as acetone, acetic acid and isopropanol and substantially insoluble in water. The acids, wherein R in the above formula is hydrogen, are also soluble in dilute sodium bicarbonate solution. These compounds are effective anti-microbials, particularly against fungal organisms. The free acids may be converted to their salts which are water-soluble and as water-soluble salts they are useful in preparations which may be administered in aqueous solutions, such as in fungicidal preparations.

Those compounds having the structure

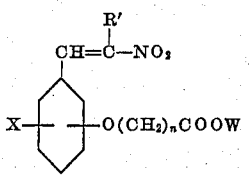

wherein R' and X and $n$ are as above specified and wherein W is phenyl or a lower alkyl group containing from 1 to 7 carbon atoms, inclusive, are prepared by causing a formylphenoxy-acetic, -propionic, or -butyric acid ester having the structure

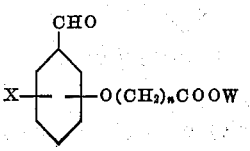

wherein X, W and $n$ are as above specified, to react with a primary amine to form an intermediate Schiff base having the structure

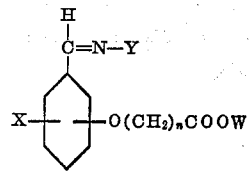

wherein =NY is a residue of a primary amine. The latter is caused to react with nitroalkane having the structure $$R'CH_2NO_2$$

to form the desired ester compound. The primary amine to be employed in the synthesis of the Schiff base is not critical. Both aliphatic and aromatic primary amines are suitable. Butylamine, amylamine, aniline and p-toluidine are some of the preferred amines.

The acids having the structure

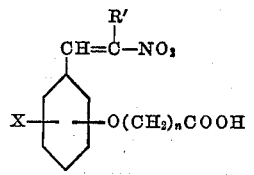

are prepared by acid catalyzed hydrolysis of the corresponding esters.

In a preferred method for the preparation of the new compounds, the formylphenoxy-acetic, -propionic or -butyric acid ester and a primary amine are heated in solvent such as benzene from 0.25 to 1.0 hour to obtain the desired Schiff base and water of reaction. Good results are obtained when substantially equimolar quantities of the reactants or a slight excess of the amine are employed. The water of reaction is removed from the mixture by distilling off as a benzene-water azeotrope and the Schiff base recovered as residue. The latter may be purified, if desired, by conventional procedures. The Schiff base and the appropriate nitroalkane are then heated together in a molar excess of a substantially anhydrous lower alkanoic acid such as glacial acetic acid to the boiling point of the mixture. The nitroalkane may be employed in proportions varying from equimolar to three to fourfold molar excess. The mixture may be maintained at the boiling point from 2 minutes to 5 minutes. The reaction mixture is allowed to cool somewhat and then poured over ice-water to precipitate the desired substituted 4 - (2 - nitroalkenyl)phenoxyalkanoate ester product. The latter may be purified by conventional methods such as washing, recrystallization or distillation.

Alternatively, the reaction between the Schiff base and the nitroalkane may be carried out by mixing the reactants and allowing the mixture to stand at room temperature for 1 to 4 days. The desired ester may precipitate from the reaction mixture. The ester, if a solid, is recovered by filtration. If no precipitation occurs or if an oily product precipitates, the mixture is poured into water, extracted with a suitable solvent such as ether and the product recovered from the ether extract by conventional means.

The acids may be prepared by heating a solution of the substituted 4-(2-nitroalkenyl)phenoxyalkanoate ester product in aqueous acetic acid in the presence of a catalytic amount of a mineral acid, such as hydrochloric acid, for from 10 minutes to 2 hours. After completion of the heating, the mixture is diluted with water and cooled to precipitate the corresponding substituted 4-(2-nitroalkenyl)phenoxyalkanoic acid product. The latter may be purified by conventional means.

The following illustrate the preparation of the intermediate Schiff base compounds

A. N-(4-CARBETHOXYMETHOXYBENZYLIDENE)-NORMAL-BUTYLAMINE

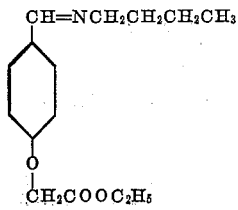

23.9 grams (0.115 mole) of ethyl 4-formylphenoxyacetate and 8.4 grams (0.115 mole) of normal-butylamine were dissolved in 100 milliliters of benzene and the mixture heated whereupon a reaction occurred with the formation of N-(4-carbethoxymethoxybenzylidene)-normal-butylamine and water of reaction. The latter was removed as it was formed by distilling from the reaction zone as a benzene-water azeotrope. After about 1 hour, no more water was formed. The pressure on the reaction mixture was then reduced and the mixture fractionally distilled to obtain a N-(4-carbethoxymethoxybenzylidene)-normal-butylamine product boiling from 160° to 180° C. at 0.2 millimeter pressure. This product is employed as an intermediate in the preparation of the phenoxyacetate compounds of the invention.

B. N-(4-CARBISOPROPOXYMETHOXY - 2 - METHOXYBENZYLIDENE)-NORMAL-BUTYLAMINE

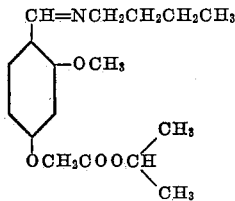

25.2 grams (0.1 mole) of isopropyl 4-formyl-3-methoxyphenoxyacetate and 7.3 grams (0.1 mole) of normal-butylamine are dissolved in 100 milliliters of benzene and the mixture heated for one hour to produce the desired product and water of reaction. The latter is distilled from the mixture as a benzene-water azeotrope. The pressure on the reaction system is then reduced and the mixture heated to distill the solvent to obtain as residue a N-(4-carbisopropoxymethoxy - 2 - methoxybenzylidene)-normal-butylamine product having a molecular weight of 307. This product is employed as an intermediate in the preparation of certain of the compounds of the invention.

C. N-(2-(2-CARBOMETHOXYETHOXY) - 4 - CHLOROBENZYLIDENE)-NORMAL-BUTYLAMINE

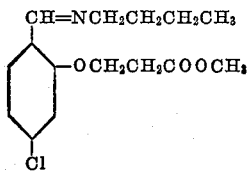

24.3 grams (0.1 mole of methyl 3-(2-formyl-5-chlorophenoxy)propionate and 7.3 grams (0.1 mole) of normal-butylamine are dissolved in 100 milliliters of benzene and the mixture heated for one hour to produce the desired product and water of reaction. The latter is distilled from the mixture as a benzene-water azeotrope. The pressure on the system is then reduced and the solvent distilled to obtain as residue a N-(2-(2-carbomethoxyethoxy)-4-chlorobenzylidene) - normal-butylamine product having a molecular weight of 297.5. This product is employed as an intermediate in certain of the compounds of this invention.

The following examples illustrate the invention but are not to be construed as limiting:

*Example 1.—Ethyl 4-(2-nitrovinyl)phenoxyacetate*

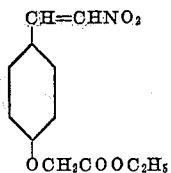

15 milliliters of glacial acetic acid was added to 5.0 grams (0.022 mole) of N-(4-carbethoxymethoxybenzylidene)-normal-butylamine prepared as described in "A" and 5.0 grams (0.08 mole) of nitromethane. An exothermic reaction took place as evidenced by spontaneous warming of the reaction mixture. The mixture was heated until the mixture began to boil and then allowed to cool somewhat and poured over ice. The resulting mixture was diluted with water whereupon an ethyl 4-(2-nitrovinyl)phenoxyacetate product precipitated as a solid. The product was removed therefrom by filtration, washed with water and dried to recover the desired compound in purified form as a crystalline solid melting at 91°–93° C.

*Example 2.—Ethyl 4-(2-nitro-1-propenyl)phenoxyacetate*

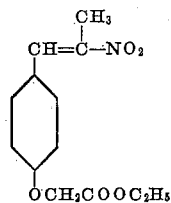

15 milliliters of glacial acetic acid was added to 5.0 grams (0.022 mole) of N-(4-carbethoxymethoxybenzylidene)-normal-butylamine and 5.0 grams (0.067 mole) of nitroethane. An exothermic reaction took place. The mixture was heated to the boiling temperature, allowed to cool somewhat and then poured into an ice-water mixture while stirring. An ethyl 4-(2-nitro-1-propenyl)phenoxyacetate product began to precipitate immediately as a yellow solid. The reaction mixture was allowed to stand with frequent stirring for two hours to complete the precipitation. The precipitate was removed by filtration and dried. After recrystallization from ethanol, the purified product melted at 79°–80° C.

*Example 3.—Ethyl 4-(2-nitro-1-butenyl)phenoxyacetate*

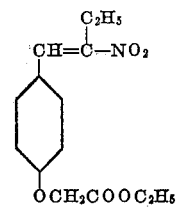

15 milliliters of glacial acetic acid was added to 5.0 grams (0.022 mole) of N-(4-carbethoxymethoxybenzylidene)-normal-butylamine and 5.0 grams (0.056 mole) of 1-nitropropane. The resulting mixture was heated to boiling, allowed to cool somewhat and then poured over ice whereupon a solid precipitated. A small amount of water was added thereto, stirred and allowed to stand for about 2 hours. The solid became an oil on warming to room temperature. The water was decanted from the oil and the latter crystallized from an ethanol-water mixture to obtain an ethyl 4-(2-nitro-1-butenyl)phenoxyphenoxyacetate product melting at 57.5°–58.5° C.

*Example 4.—4-(2-nitrovinyl)phenoxyacetic acid*

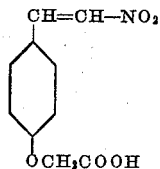

5.0 grams (0.02 mole) of ethyl 4-(2-nitrovinyl)-phenoxyacetate was dissolved in a mixture of 35 milliliters of acetic acid and 25 milliliters of water. One milliliter of concentrated hydrochloric acid was added thereto and the resulting mixture refluxed for one hour. At the end of this period the mixture was allowed to cool and finally chilled in an ice bath to precipitate a 4-(2-nitrovinyl)-phenoxyacetic acid product. The latter was recovered by filtration, washed and dried to obtain a purified product as orange-yellow crystals melting at 195°–196° C.

*Example 5.—4-(2-nitro-1-butenyl)phenoxyacetic acid*

5.0 grams (0.017 mole) of ethyl 4-(2-nitro-1-butenyl)-phenoxyacetate was dissolved in a mixture of 35 milliliters of glacial acetic acid and 25 milliliters of water containing 2 milliliters of concentrated hydrochloric acid by heating. The solution was refluxed for one hour. After completion of the heating, about 50 milliliters of water was added thereto and the resulting mixture allowed to cool whereupon crystals of a 4-(2-nitro-1-butenyl)phenoxyacetic acid product precipitated. The latter was removed from the mixture by filtration, washed and dried to recover a purified product melting at 135°–136° C.

*Example 6.—4-(2-nitro-1-propenyl)phenoxyacetic acid*

5.0 grams (0.018 mole) of ethyl 4-(2-nitro-1-propenyl)phenoxyacetate was added to a mixture of 30 milliliters of acetic acid, 20 milliliters of water and 2 milliliters of concentrated hydrochloric acid. The mixture was refluxed for 1.5 hours. After completion of the heating, about 50 milliliters of water was added thereto and the resulting mixture allowed to stand about one hour in an ice bath whereupon a 4-(2-nitro-1-propenyl)phenoxyacetic acid product precipitated. The latter was removed from the mixture by filtration, washed with water and dried to obtain a purified product melting at 150°–152° C.

*Example 7.—Isopropyl 3-methoxy-4-(2-nitrovinyl) phenoxyacetate*

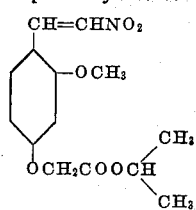

15 milliliters of glacial acetic acid is added to 5.0 grams (0.016 mole) of N-(4-carbisopropoxymethoxy-2-methoxybenzylidene)-normal-butylamine as prepared in "B" and 5 grams (0.08 mole) of nitromethane. The mixture is heated until the mixture begins to boil and then cooled somewhat and poured over ice, and diluted with water to precipitate a product. The latter is extracted with ether and the ether extract warmed to vaporize the solvent to obtain an isopropyl 3-methoxy-4-(2-nitrovinyl)phenoxyacetate product having a molecular weight of 295.

*Example 8.—Methyl 3-(5-chloro-2-(2-nitro-1-propenyl) phenoxy)propionate*

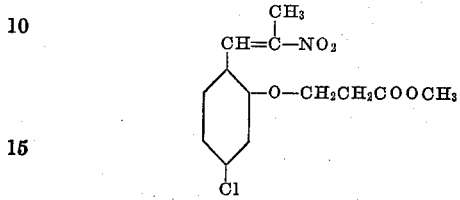

15 milliliters of glacial acetic acid is added to 5.0 grams (0.017 mole) of N-(2-(2-carbomethoxyethoxy)-4-chlorobenzylidene)-normal-butylamine as prepared in "C" and 5.0 grams (0.067 mole) of nitroethane. The mixture is allowed to stand for 3 days whereupon some solid precipitates. The mixture is diluted with water to precipitate further solid. The latter is recovered by filtration, washed and dried to obtain a methyl 3-(5-chloro-2-(2-nitro-1-propenyl)phenoxy)propionate product having a molecular weight of 299.5.

In preparations carried out in a similar manner, the following phenoxyalkanoates are prepared:

Normal-amyl 3-(2-nitro-1-butenyl)phenoxyacetate having a molecular weight of 321 by the reaction of amyl 3-formylphenoxyacetate with aniline to produce the intermediate N-(3-carbo-normal-amyloxymethoxybenzylidene)-aniline followed by a reaction of the latter with 1-nitropropane.

Isobutyl 2-propyl-4-(2-nitro-1-propenyl)phenoxyacetate having a molecular weight of 355 by the reaction of isobutyl 4-formyl-2-propylphenoxyacetate with normal-amylamine to produce the intermediate N-(4-carbisobutoxymethoxy-3-propylbenzylidene)-normal-amylamine followed by a reaction of the latter was nitroethane.

Methyl 4-(3-normal-butyl-4-nitrovinylphenoxy)butyrate having a molecular weight of 321 by the reaction of methyl 4-(3-normal-butyl-4-formylphenoxy)butyrate with toluidine to produce the intermediate N-(4-(3-carbomethoxy-normal-propoxy)-2-normal-butylbenzylidene)-toluidine followed by a reaction of the latter with nitromethane.

Methyl 4-(2-nitro-1-nonenyl)phenoxyacetate having a molecular weight of 260 by the reaction of methyl 4-formyl-phenoxyacetate with normal-butylamine to produce the intermediate N-(4-carbomethoxymethoxybenzylidene)-normal-butylamine followed by the reaction of the latter with 1-nitrooctane.

Isopropyl 4-(2-nitro-1-heptenyl)phenoxyacetate having a molecular weight of 260 by the reaction of isopropyl 4-formylphenoxyacetate with normal-butylamine to produce the intermediate N-(4-carbisopropoxymethoxybenzylidene)-normal-butylamine followed by the reaction of the latter with 1-nitrohexane.

3-(2-nitro-1-butenyl)phenoxyacetic acid having a molecular weight of 251 by the acid hydrolysis of normal-amyl 3-(2-nitro-1-butenyl)phenoxyacetate.

2-propyl-4-(2-nitro-1-propenyl)phenoxyacetic acid having a molecular weight of 279 by the acid hydrolysis of isobutyl 2-propyl-4-(2-nitro-1-propenyl)phenoxyacetate.

4-(3-normal-butyl-4-nitrovinylphenoxy)butyric acid having a molecular weight of 307 by the acid hydrolysis of methyl 4-(3-normal-butyl-4-nitrovinylphenoxy)butyrate.

4-(2-nitro-1-heptenyl)phenoxyacetic acid having a molecular weight of 218 by the acid hydrolysis of isopropyl 4-(2-nitro-1-heptenyl)phenoxyacetate.

Example 9.—Ethyl 4-(β-nitrostyryl)phenoxyacetate

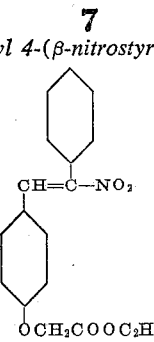

20.8 grams (0.1 mole) of ethyl 4-formylphenoxyacetate and 10 milliliters (0.1 mole) of normal-butylamine were dissolved in 75 milliliters of benzene and the mixture heated to distill off the water of reaction as a benzene-water azeotrope. The remaining benzene was distilled out under reduced pressure to obtain an N-(4-carbethoxymethoxybenzylidene)-normal-butylamine product as residue.

13.7 grams (0.1 mole) of phenylnitromethane and 20 milliliters of glacial acetic acid were added to the above residue and the resulting mixture stirred. An exothermic reaction took place and the temperature of the mixture rose to 51° C. The mixture was allowed to stand at room temperature for 5 days and then poured into ice-water to precipitate an oil. The water was decanted therefrom and ethanol added to the oil. The resulting alcohol solution was allowed to stand overnight at room temperature whereupon the mixture became a semi-solid mass. Additional alcohol was added thereto and the mixture allowed to stand overnight to obtain an ethyl 4-(β-nitrostyryl)phenoxyacetate product as a yellow crystalline solid. The latter after recrystallization from alcohol melted at 69.5°–70.5° C. The nitrogen content of the product was 4.43 percent. The theoretical value is 4.28 percent.

Example 10.—Phenyl 4-(nitrovinyl)phenoxyacetate

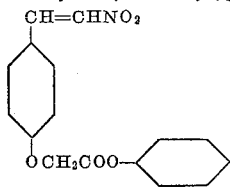

25.6 grams (0.1 mole) of phenyl 4-formylphenoxyacetate and 8.3 milliliters (0.1 mole) of normal-propylamine are dissolved in 75 milliliters of benzene and heated to distill off the water of reaction as a benzene-water azeotrope. The remaining benzene is distilled out under reduced pressure to obtain an N-(4-carbophenoxymethoxybenzylidene)-normal-propylamine product as residue.

A solution of 18.4 grams (0.3 mole) of nitromethane in 25 milliliters of propionic acid is added to the above residue and the resulting mixture stirred. The mixture is allowed to stand at room temperature for 4 days and then poured into ice-water to precipitate a phenyl 4-(β-nitrostyryl)phenoxyacetate product having a molecular weight of 299.2.

Example 11.—Normal-heptyl 3-(4-(β-nitrostyryl)phenoxy)propionate

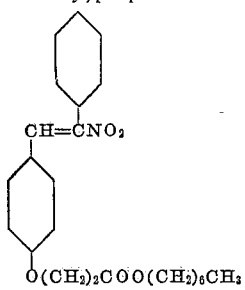

29.2 grams (0.1 mole) of normal-heptyl 3-(4-formylphenoxy)propionate and 10 milliliters of normal-butylamine are dissolved in 75 milliliters of benzene and heated to distill off the water of reaction as a benzene-water azeotrope. The remaining benzene is distilled out under reduced pressure to obtain an N-(4-(2-carbo-normal-heptyloxyethoxy)benzylidene)-normal-butylamine product as residue.

A solution of 13.7 grams (0.1 mole) of phenylnitromethane in 20 milliliters of glacial acetic acid is added to the above residue and the resulting mixture stirred. The mixture is allowed to stand at room temperature for 4 days and then poured into ice-water to precipitate a normal-heptyl 3-(4-(β-nitrostyryl)phenoxy)propionate having a molecular weight of 411.5.

Example 12.—4-(β-nitrostyryl)phenoxyacetic acid

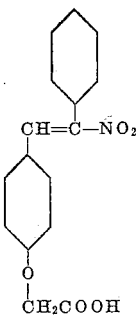

3.6 grams (0.02 mole) of ethyl 4-(β-nitrostyryl)phenoxyacetate is dissolved in 40 milliliters of acetic acid and 20 milliliters of water. One milliliter of concentrated hydrochloric acid is added thereto and the resulting mixture refluxed one hour. At the end of this period, the mixture is cooled to precipitate a 4-(β-nitrostyryl)phenoxyacetic acid product having a molecular weight of 300.28.

The compounds of this invention are useful as parasiticides adapted to be employed for the control of bacterial and fungal organisms. In a representative operation, ethyl 4-(2-nitrovinyl)phenylacetate was added to nutrient media to give a concentration of 0.05 percent and the media inoculated with Staphylococcus aureus and Aspergillus terreus and incubated at 30° C. for four days. At the end of this period, complete inhibition of growth of the test organisms was observed.

Certain of the Schiff bases employed in the synthesis of the phenoxy compounds of the present invention are described and claimed in a copending application by Dale N. Robertson, filed concurrently herewith as Serial No. 616,659.

I claim:
1. A compound having the structure

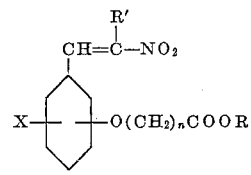

wherein X is a member of the group consisting of hydrogen, alkoxy radicals containing from 1 to 4 carbon atoms, inclusive, alkyl radicals containing from 1 to 4 carbon atoms, inclusive, and halogen, R is a member of the group consisting of hydrogen, phenyl and lower alkyl radicals containing from 1 to 7 carbon atoms, inclusive, R' is a member of the group consisting of phenyl and lower alkyl radicals containing from 1 to 7 carbon atoms, inclusive, and n is an integer of from 1 to 3, inclusive.
2. 4-(2-nitro-1-butenyl)phenoxyacetic acid.
3. 4-(2-nitro-1-propenyl)phenoxyacetic acid.
4. Ethyl 4-(2-nitro-1-propenyl)phenoxyacetate.
5. Ethyl 4-(2-nitro-1-butenyl)phenoxyacetate.

6. A process for preparing phenoxy compounds having the structure

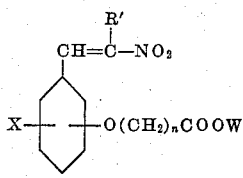

wherein X is a member of the group consisting of hydrogen, alkoxy radicals containing from 1 to 4 carbon atoms, inclusive, and halogen, W represents a member of the group consisting of phenyl and lower alkyl radicals containing from 1 to 7 carbon atoms, inclusive, and R' is a member of the group consisting of hydrogen, phenyl and lower alkyl radicals containing from 1 to 7 carbon atoms, inclusive, and $n$ is an integer of from 1 to 3, inclusive, which comprises causing a Schiff base having the structure

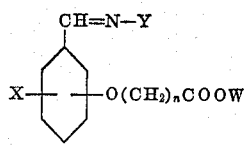

wherein X and W are as above defined and =NY is a residue of a primary amine, to react with a nitroalkane having the structure $$R'CH_2NO_2$$

wherein R' is as above defined, in the presence of a substantially anhydrous lower alkanoic acid.

7. A process for preparing phenoxy compounds having the structure

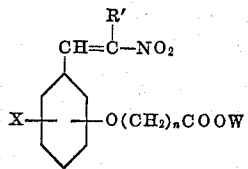

wherein X is a member of the group consisting of hydrogen, alkoxy radicals containing from 1 to 4 carbon atoms, inclusive, and halogen, W represents a member of the group consisting of phenyl and lower alkyl radicals containing from 1 to 7 carbon atoms, inclusive, and R' is a member of the group consisting of hydrogen, phenyl and lower alkyl radicals containing from 1 to 7 carbon atoms, inclusive, and $n$ is an integer of from 1 to 3, inclusive, which comprises (1) condensing an aldehyde having the structure

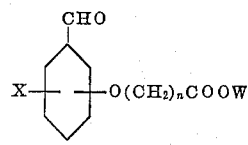

wherein X and W are as above defined, with a primary amine to produce a Schiff base having the structure

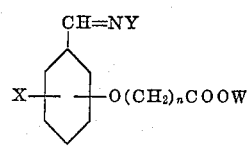

wherein X and W are as above defined and =NY is a residue of a primary amine and (2) causing the Schiff base so produced to react with a nitroalkane having the structure $$R'CH_2NO_2$$

wherein R' is as above defined in the presence of a substantially anhydrous lower aliphatic organic acid to produce the desired phenoxy compound.

References Cited in the file of this patent

Beilstein, 6, 562–3, 570 (1923); 278 (1931).